US009516161B1

(12) United States Patent
Marcus

(10) Patent No.: US 9,516,161 B1
(45) Date of Patent: Dec. 6, 2016

(54) ARTIFICIAL CALL DEGRADATION

(71) Applicant: Verizon Patent and Licensing Inc., Arlington, VA (US)

(72) Inventor: Jason Marcus, Piscataway, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/816,919

(22) Filed: Aug. 3, 2015

(51) Int. Cl.
*H04M 3/00* (2006.01)
*H04M 3/22* (2006.01)
*H04M 3/36* (2006.01)
*H04M 1/725* (2006.01)
*H04M 1/60* (2006.01)
*G10L 15/22* (2006.01)
*G10L 21/007* (2013.01)
*G10L 15/19* (2013.01)
*G10L 15/08* (2006.01)

(52) U.S. Cl.
CPC ............ *H04M 3/2236* (2013.01); *G10L 15/19* (2013.01); *G10L 15/22* (2013.01); *G10L 21/007* (2013.01); *H04M 1/6025* (2013.01); *H04M 1/72569* (2013.01); *H04M 3/367* (2013.01); *G10L 2015/088* (2013.01)

(58) Field of Classification Search
CPC ........ H04W 4/22; H04W 4/008; H04W 84/12; H04W 76/007; H04W 52/0261; H04M 1/73; H04M 1/72536
USPC ............................................ 455/404.1, 404.2
See application file for complete search history.

(56) References Cited

U.S. PATENT DOCUMENTS

| 5,448,751 | A   | * | 9/1995  | Takenaka    | H04W 16/02 455/450   |
|-----------|-----|---|---------|-------------|----------------------|
| 6,496,709 | B2  | * | 12/2002 | Murray      | H04M 1/72569 455/412.1 |
| 8,874,448 | B1  | * | 10/2014 | Kauffmann   | G10L 25/78 381/107   |
| 2003/0215078 | A1 | * | 11/2003 | Brahm       | H04M 3/4281 379/211.02 |
| 2004/0253940 | A1 | * | 12/2004 | Andrews     | H04L 12/5695 455/405 |
| 2006/0025149 | A1 | * | 2/2006  | Karaoguz    | H04N 21/4126 455/452.2 |
| 2006/0109786 | A1 | * | 5/2006  | Abdel-Kader | H04L 29/06027 370/232 |
| 2010/0041443 | A1 | * | 2/2010  | Yokota      | H04M 1/6083 455/569.2 |
| 2010/0250253 | A1 | * | 9/2010  | Shen        | H04R 1/1041 704/260  |
| 2011/0065484 | A1 | * | 3/2011  | Liu         | H04M 1/72569 455/569.2 |
| 2012/0252427 | A1 | * | 10/2012 | Aaron       | G06Q 30/02 455/418   |
| 2013/0279719 | A1 | * | 10/2013 | Lee         | G06F 3/165 381/107   |

*Primary Examiner* — Charles Shedrick

(57) ABSTRACT

The device may detect a trigger to perform call degradation on audio and/or video of a call. The call may be with another device. The device may identify one or more parameters associated with performing call degradation on the audio and/or video of the call. The one or more parameters may include a parameter associated with degrading the audio and/or video of the call. The device may perform the call degradation on the audio and/or video of the call based on detecting the trigger to perform the call degradation and based on the one or more parameters to generate degraded audio and/or video output. The device may provide the degraded audio and/or video output to the other device.

20 Claims, 12 Drawing Sheets

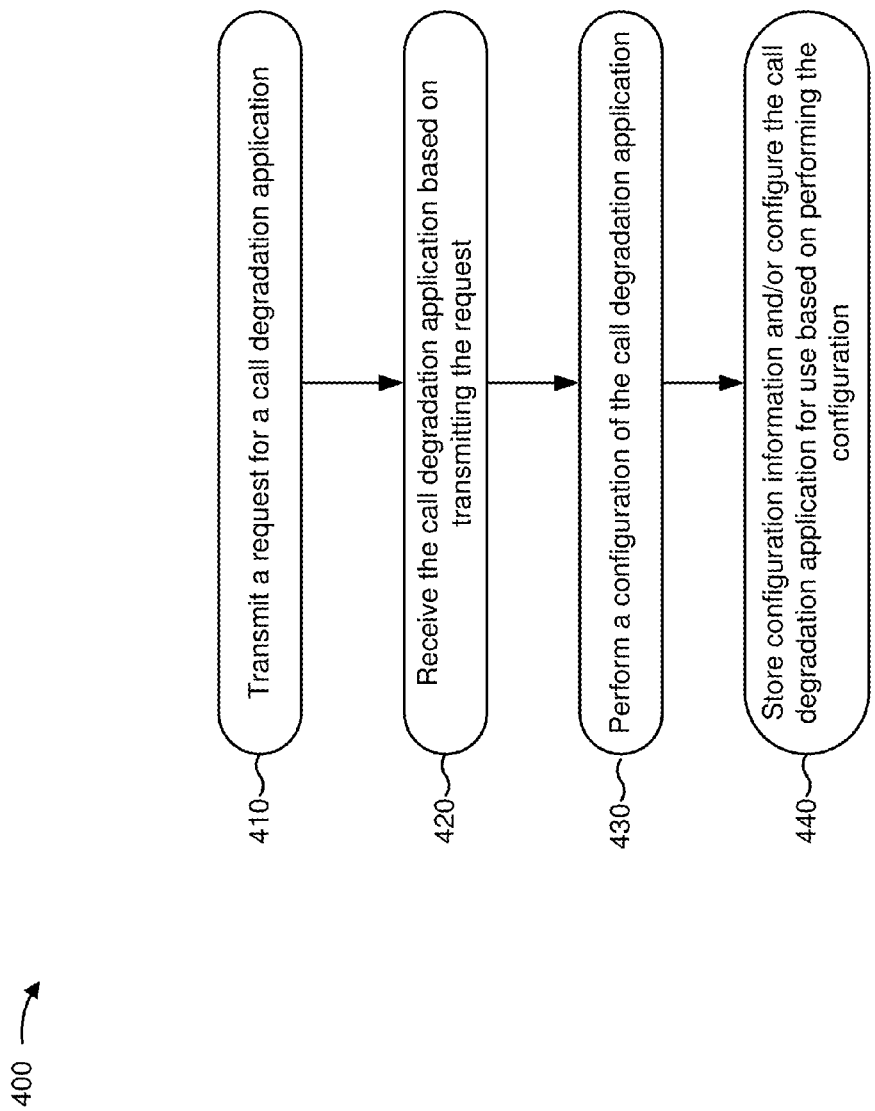

ARTIFICIAL CALL DEGRADATION

BACKGROUND

Mobile devices, such as smart phones, may be used to facilitate communication between users via audio calls, video calls, or the like. For example, a first mobile device may receive audio via a microphone, may process the audio, and may provide the audio to a second mobile device. The second mobile device may receive the audio from the first mobile device and may provide the audio to a second user via a speaker. When the first mobile device is moved into an area with poor network reception (e.g., a tunnel, an elevator, or the like), the audio may degrade during transmission to the second mobile device resulting in the audio being difficult to understand. In some cases, the call may drop based on the poor network reception.

BRIEF DESCRIPTION OF THE DRAWINGS

FIG. 4 is a flow chart of an example process for configuring a call degradation application;

DETAILED DESCRIPTION OF PREFERRED EMBODIMENTS

The following detailed description of example implementations refers to the accompanying drawings. The same reference numbers in different drawings may identify the same or similar elements.

A first user may use a first mobile device (e.g., a smart phone) to call a second user using a second mobile device. The first mobile device may receive audio from the first user (e.g., via a microphone), may process the audio, and may provide the audio as output. For example, the first mobile device may generate a set of packets, corresponding to the audio, for transmission to the second mobile device. The second mobile device may receive the audio from the first mobile device (e.g., via the set of packets) and may output the audio for the second user. However, the first user may not wish to continue the call with the second user. For example, the first user may be engaged with performing another task, the call may pertain to an uncomfortable subject matter, or the like. If the first user ends the call, the first user may appear impolite to the second user. Implementations, described herein, may degrade audio and/or video of a call, thereby resembling a call being placed from a location with poor call quality and/or from a location with an increased likelihood of the call being dropped. In this way, the mobile device may assist a user in ending the call without the user appearing impolite.

Figure 1:
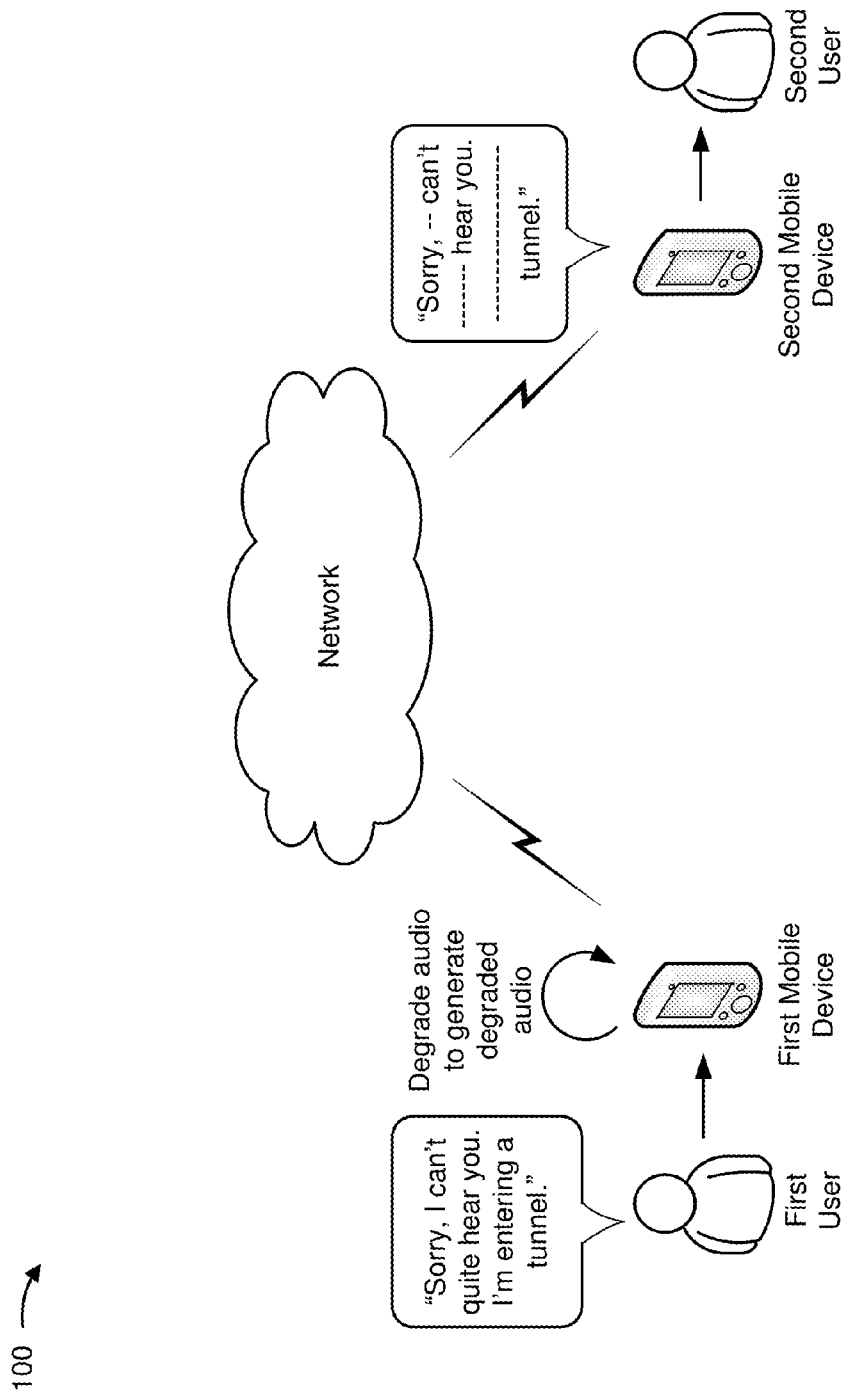
FIG. 1 is a diagram of an overview of an example implementation described herein.

FIG. 1 is a diagram of an overview of an example implementation 100 described herein. As shown in FIG. 1, example implementation 100 may include a first mobile device, a second mobile device, and a network. The first mobile device may utilize a call degradation application that facilitates audio degradation for a call. The call degradation application may be downloaded, such as from an application data structure, a server device, or the like. The call degradation application may be configured prior to utilization (e.g., by the first mobile device, by a user of the first mobile device, by a server device, or the like). For example, the first mobile device may select a type of activation for call degradation (e.g., activation based on a button press, activation based on receiving an incoming call, etc.), a type of call degradation that is to be performed (e.g., altering a volume, periodically removing a portion of audio, etc.), or the like.

As further shown in FIG. 1, a first user may utilize the first mobile device to call a second user of the second mobile device. The first mobile device may receive audio as input based on a microphone of the first mobile device recording the first user speaking. For example, the first user may indicate that the first user is entering an area of poor reception, such as a tunnel, an elevator, or the like. The first mobile device may degrade the audio and generate degraded output based on a configuration of the call degradation application. For example, the first mobile device may cause the audio to be altered with portions of the audio, representing one or more words, being removed. Further to the example, the first mobile device may process the audio to identify a particular word of the audio and ensure that the particular word (e.g., "elevator," "tunnel," "signal," etc.) is exempted from removal. The first mobile device may provide the degraded audio to the second mobile device. For example, the first mobile device may encapsulate the degraded audio via a set of packets, and may provide the set of packets to the second mobile device (e.g., via the network) for playback. The first mobile device may end the call without the first user appearing impolite based on the second user interpreting the degraded audio as an indication of a poor connection between the first mobile device and the second mobile device. In this way, user experience may be improved relative to a user abruptly ending a call with non-degraded audio. Moreover, network performance may be improved based on reducing call quantity and/or causing users to utilize text messaging, email, or the like rather than a voice call.

Although implementations, described herein, may refer to a call and/or call degradation in terms of an audio call and/or audio degradation, implementations described herein may also be utilized for a video call and/or video degradation, an audio-video call and/or audio-video degradation, or the like.

Figure 2:
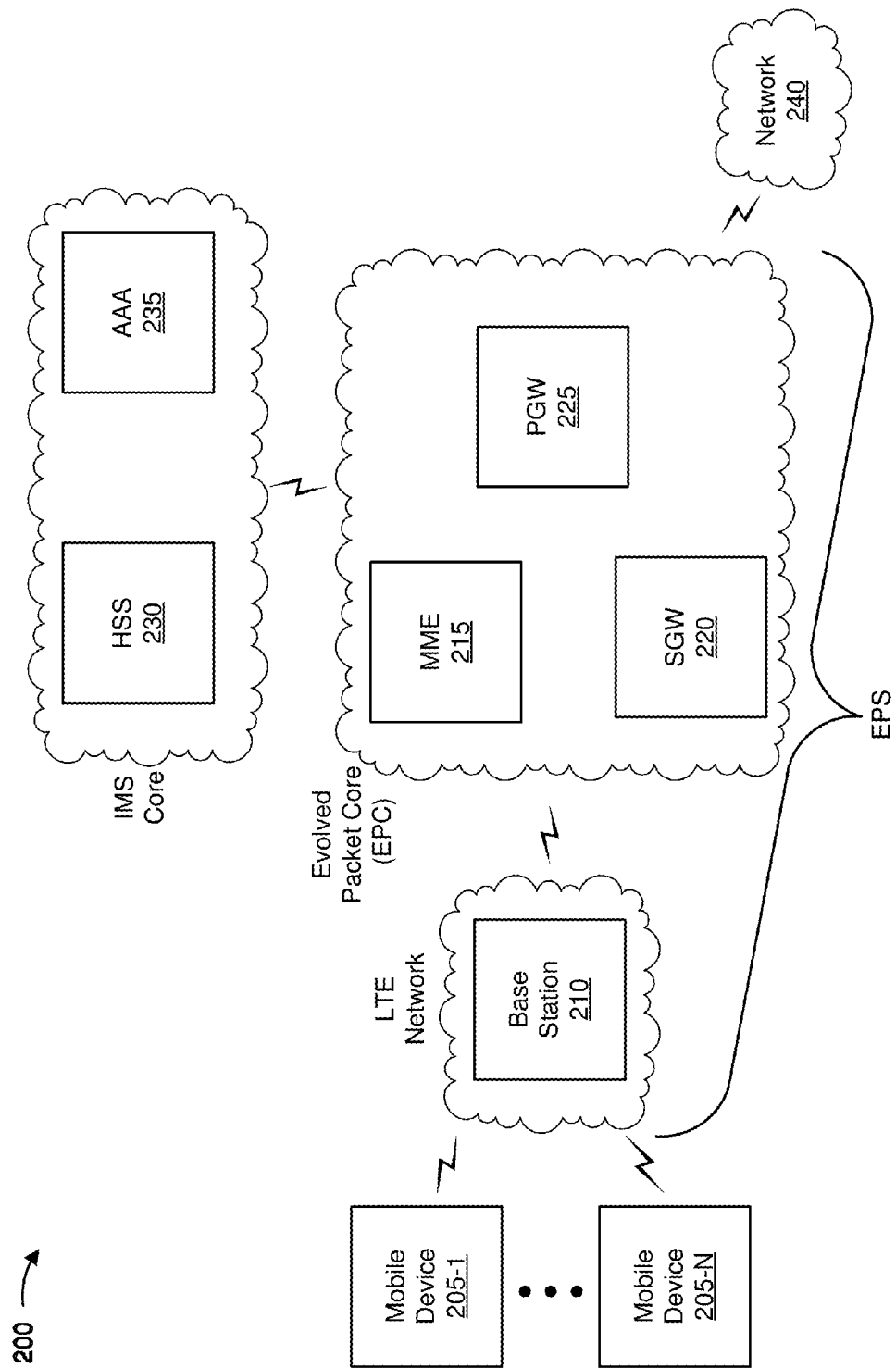
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include two or more mobile devices 205-1 through 205-N (N>1) (hereinafter referred to collectively as "mobile devices 205," and individually as "mobile device 205"); a base station 210; a mobility management entity device (MME) 215; a serving gateway (SGW) 220; a packet data network gateway (PGW) 225; a home subscriber server (HSS) 230; an authentication, authorization, and accounting server (AAA) 235; and a network 240. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile device 205 communicates with the EPC. The EPC may include MME 215, SGW 220, and/or PGW 225 that enable mobile device 205 to communicate with network 240 and/or an Internet protocol (IP) multimedia subsystem (IMS) core. The IMS core may include HSS 230 and/or AAA 235, and may manage device registration and authentication, session initiation, etc., associated with mobile devices 205. HSS 230 and/or AAA 235 may reside in the EPC and/or the IMS core.

Mobile device 205 may include one or more devices capable of communicating with base station 210 and/or a network (e.g., network 240). For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. In some implementations, mobile device 205 may include a call degradation application that may facilitate degradation of a call with another mobile device 205. Mobile device 205 may send traffic to and/or receive traffic from network 240 (e.g., via base station 210, SGW 220, and/or PGW 225).

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 240 via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 240 (e.g., via PGW 225) and/or other network devices associated with the EPC and/or the IMS core. SGW 220 may also receive traffic from network 240 and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 240. Additionally, or alternatively, PGW 225 may receive traffic from network 240, and may send the traffic to mobile device 205 via SGW 220 and base station 210. PGW 225 may record data usage information (e.g., byte usage), and may provide the data usage information to AAA 235.

HSS 230 may include one or more devices, such as one or more server devices, capable of managing (e.g., receiving, generating, storing, processing, and/or providing) information associated with mobile device 205. For example, HSS 230 may manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 may include one or more devices, such as one or more server devices, that perform authentication, authorization, and/or accounting operations for communication sessions associated with mobile device 205. For example, AAA 235 may perform authentication operations for mobile device 205 and/or a user of mobile device 205 (e.g., using one or more credentials), may control access, by mobile device 205, to a service and/or an application (e.g., based on one or more restrictions, such as time-of-day restrictions, location restrictions, single or multiple access restrictions, read/write restrictions, etc.), may track resources consumed by mobile device 205 (e.g., a quantity of voice minutes consumed, a quantity of data consumed, etc.), and/or may perform similar operations.

Network 240 may include one or more wired and/or wireless networks. For example, network 240 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
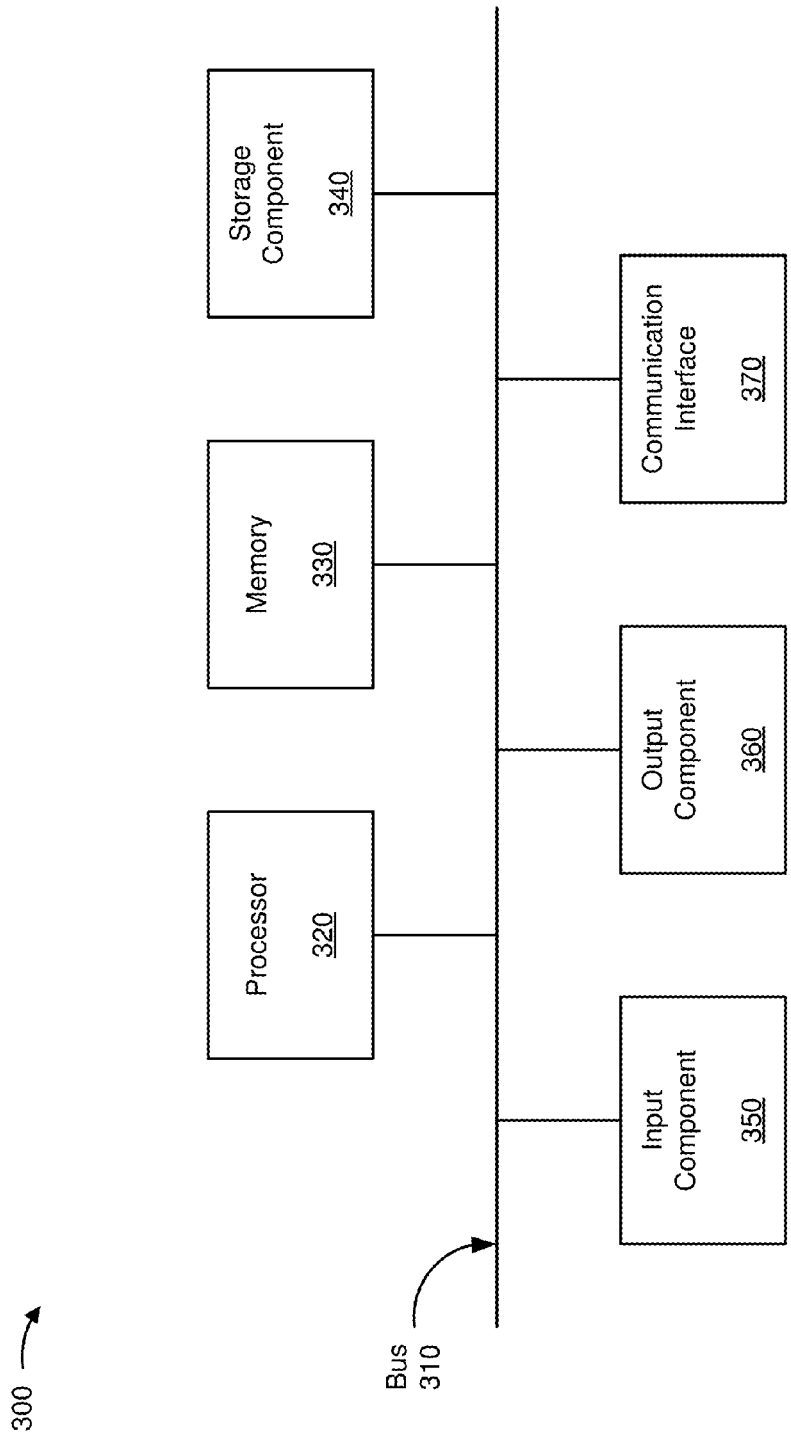
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, HSS 230, and/or AAA 235. In some implementations, mobile device 205, base station 210, MME 215, SGW 220, PGW 225, HSS 230, and/or AAA 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for configuring a call degradation application. In some implementations, one or more process blocks of FIG. 4 may be performed by mobile device 205. In some implementations, one or more process blocks of FIG. 4 may be performed by another device or a group of devices separate from or including mobile device 205, such as base station 210, MME 215, SGW 220, PGW 225, HSS 230, and/or AAA 235.

As shown in FIG. 4, process 400 may include transmitting a request for a call degradation application (block 410). For example, mobile device 205 may transmit the request for the call degradation application to a server device associated with network 240. In some implementations, mobile device 205 may transmit the request, via network 240, to a server device associated with an application store. For example, mobile device 205 may request information identifying one or more available applications and the server device may provide information indicating that the call degradation application is available from the application store. In this case, mobile device 205 may request the call degradation application based on determining that the call degradation application is available. In some implementations, the call degradation application may be provided with mobile device 205 without a download from an application store.

In some implementations, mobile device 205 may provide purchase information associated with purchasing the call degradation application when transmitting the request. For example, mobile device 205 may include, in the request, information identifying a password, a credit card number, an address or the like. Additionally, or alternatively, mobile device 205 may provide identification information associated with mobile device 205, such as location information, a username, a device identifier, an Internet protocol (IP) address, or the like.

A call degradation application may refer to an application that facilitates mobile device 205 degrading audio and/or video to resemble a poor quality call (e.g., a call from an elevator, a tunnel, or the like.). For example, mobile device 205 may receive audio input, may degrade the audio based on one or more parameters of the call degradation application, and may provide the degraded audio to another mobile device 205.

As further shown in FIG. 4, process 400 may include receiving the call degradation application based on transmitting the request (block 420). For example, mobile device 205 may receive the call degradation application based on transmitting the request for the call degradation application to a server device of network 240. In some implementations, mobile device 205 may download the application from the server device of network 240. Additionally, or alternatively, mobile device 205 may receive authorization to use the call degradation application when receiving the call degradation application. For example, mobile device 205 may receive, from an application store of network 240, a password with which to use the call degradation application based on transmitting the request for the call degradation application. In some implementations, mobile device 205 may obtain the call degradation application from a data structure in which the call degradation application is stored, such as a data structure of mobile device 205, a remote data structure associated with network 240, or the like.

As further shown in FIG. 4, process 400 may include performing a configuration of the call degradation application (block 430). For example, mobile device 205 may configure one or more parameters of the call degradation application. In some implementations, mobile device 205 may provide a user interface to receive a user selection of one or more parameters associated with configuring the call degradation application. For example, mobile device 205 may provide a user interface that includes one or more elements to receive information from a user such as a text field, a button, a check box, a drop down menu, or the like. Additionally, or alternatively, mobile device 205 may configure the call degradation application based on information received from a server device. For example, mobile device 205 may configure the call degradation application based on a set of default parameters.

In some implementations, mobile device 205 may select a parameter associated with a type of activation for the call degradation application when configuring the call degradation application. When the call degradation application is activated, mobile device 205 may monitor information (e.g., audio information, call information, application information, or the like) to detect a trigger to perform call degradation. For example, mobile device 205 may configure the call degradation application to activate based on a telephone number of an incoming call, and, when the telephone number is detected, mobile device 205 may activate the call degradation application to monitor information for a trigger to perform call degradation. Additionally, or alternatively, mobile device 205 may configure the call degradation application to activate based on a call history associated with an incoming call. In some implementations, mobile device 205 may configure the call degradation application to activate based on a user input. For example, mobile device 205 may provide a button that the user may select to cause mobile device 205 to activate the call degradation application. Additionally, or alternatively, the call degradation application may be configured to activate automatically. For example, mobile device 205 may activate, and keep active, the call degradation application as part of a startup procedure.

In some implementations, mobile device 205 may select a parameter associated with a threshold time at which to trigger call degradation. For example, mobile device 205 may determine that a call duration threshold is satisfied, and may trigger call degradation. In some implementations, the call duration threshold may be determined based on identification information associated with a caller (e.g., a telephone number, a previous call duration or the like). For example, mobile device 205 may select a first call duration threshold for a first caller and a second call duration threshold for a second caller. In this way, based on ending the call after performing call degradation, mobile device 205 may reduce a power usage, a memory usage, or the like relative to permitting the call to continue for a period of time past the call duration threshold.

In some implementations, mobile device 205 may cause the call degradation application to trigger call degradation based on call content. For example, mobile device 205 may configure the call degradation application to monitor the call and to perform call degradation based on detecting a word, a phrase (e.g., "I'm entering an area of poor reception"), a sound (e.g., a cough, a whistle, etc.), a tone of voice (e.g., a stern tone, an exasperated tone, etc.), a volume level satisfying a threshold, or the like. In this way, mobile device 205 may utilize the call degradation application without a user interfacing with a user interface of mobile device 205.

In some implementations, mobile device 205 may configure a parameter to trigger call degradation based on identifying information associated with a caller. For example, mobile device 205 may configure a parameter to trigger call degradation based on determining that a call is with a particular telephone number, a particular contact name, or the like. In some implementations, mobile device 205 may configure the call degradation application to monitor the call and trigger call degradation based on mobile device 205 detecting a particular acceleration. For example, mobile device 205 may be configured to perform call degradation based on a user shaking mobile device 205.

In some implementations, mobile device 205 may provide call audio to a server for processing. For example, mobile device 205 may utilize a server to identify words of the call audio, insert one or more sound gaps into the audio, or the like. In this case, mobile device 205 may configure the call degradation application to activate based on determining that a Wi-Fi signal is available for use. In this way, mobile device 205 may utilize less mobile data when utilizing the call degradation application relative to providing the call audio for processing via a cellular connection.

In some implementations, mobile device 205 may configure the call degradation application to perform call degradation based on a global positioning location associated with mobile device 205. For example, mobile device 205 may configure the call degradation application to perform call degradation based on determining that mobile device 205 is located at a particular location (e.g., a home, an office, a recreational facility or the like). In this way, mobile device 205 may activate call degradation when a user is in a location where a conversation is undesirable.

In some implementations, mobile device 205 may configure a parameter associated with providing an indication after call degradation is triggered. For example, mobile device 205 may provide an indicator light, an indicator sound, an indicator vibration, or the like based on performing call degradation. In this way, mobile device 205 may alert a user that call degradation is being performed, thereby reducing a likelihood that the user ends a call impolitely without performing call degradation.

Additionally, or alternatively, mobile device 205 may configure the call degradation application to trigger call degradation by a combination of events based on a determined configuration hierarchy. A configuration hierarchy may include events occurring in parallel, as intermediate steps, as a result of information associated with mobile device 205 (e.g., an input audio, a global positioning location, a call history, a message history, calendar information, etc.), or the like. For example, mobile device 205 may configure the call degradation application to trigger call degradation after satisfying a particular call duration threshold and after a user interaction with a button. In this way, mobile device 205 may reduce a likelihood that call degradation is performed inadvertently, when it is not desired by a user, relative to triggering call degradation based on a single trigger.

In some implementations, mobile device 205 may configure the call degradation application to perform call degradation based on information from a calendar associated with mobile device 205. For example, mobile device 205 may determine a particular time period where a user is engaged in a task, event, meeting or the like based on calendar information. In this case, mobile device 205 may trigger call degradation based on determining that the call is occurring during the particular time. In this way, mobile device 205 may utilize additional application information when triggering call degradation.

In some implementations, mobile device 205 may select a parameter associated with an audio degradation type for the call degradation application when configuring the call degradation application. For example, mobile device 205 may determine to include one or more sound gaps in the audio at a particular rate, for a particular length of time, or the like. Inserting a sound gap may include removing portions of audio at a particular intervals for a particular length of time. For example, mobile device 205 may select a parameter associated with inserting a sound gap at an arbitrarily spaced interval and/or for an arbitrary length of time based on a set of randomization parameters.

In some implementations, mobile device 205 may configure call degradation to resemble a scenario of poor call quality, such as an elevator, a tunnel, a valley, or the like. For example, mobile device 205 may select a parameter indicating a valley configuration, an elevator configuration, a tunnel configuration, or the like. In this way, mobile device 205 may imitate a natural scenario where a call drops, providing a socially acceptable reason for mobile device 205 to end the call. Additionally, or alternatively, mobile device 205 may configure the call degradation application to degrade call audio based on a signal strength associated with a location. For example, mobile device 205 may degrade audio in a particular manner based on determining that mobile device 205 is located in an area with strong cellular reception (e.g., an office, a home, or the like). In this way, mobile device 205 may degrade call audio based on a location associated with mobile device 205, thereby improving realism of call degradation relative to performing call degradation to resemble an arbitrary location.

In some implementations, mobile device 205 may select a parameter associated with selectively degrading the call based on one or more words. For example, mobile device 205 may determine a set of allowable words that are not to be degraded (e.g., "sorry," "hear," "connection," "tunnel," "text," "elevator," "later," or the like). In this case, mobile device 205 may insert sound gaps to remove words that are not included in the set of allowable words, and may omit a detected word, that is included in the set of allowable words, from degradation. In this way, mobile device 205 may permit the user to convey important information to the other caller when performing call degradation.

In some implementations, mobile device 205 may configure the call degradation application to add an audio and/or video artifact (e.g., a sound, a tone, a voice, or the like) to the degraded audio. For example, mobile device 205 may add an ambient noise to the degraded audio to resemble a natural scenario (e.g., an elevator sound for an elevator natural scenario). Additionally, or alternatively, mobile device 205 may configure the call degradation application to pixilate a video call, to freeze a video call, to distort a video call, to add visual noise to a video call (e.g., snow), or the like based on a call degradation parameter. In some implementations, mobile device 205 may configure the call degradation to alter the volume of the degraded audio. For example, mobile device 205 may reduce an audio volume during the call, increase a volume of the call, fluctuate the volume of a call, or the like.

In some implementations, mobile device 205 may determine a parameter associated with ending a call after performing call degradation. For example, mobile device 205 may configure the parameter to cause a user interface to include a button to end a call. In some implementations, mobile device 205 may configure a parameter associated with ending a call based on detecting a particular word (e.g., "later," "bye," or the like). Additionally, or alternatively, mobile device 205 may configure a parameter to cause mobile device 205 to end the call after satisfying a particular threshold period of time and without a user interaction with a user interface.

In some implementations, mobile device 205 may configure the call degradation application to cause mobile device 205 to provide a message based on the call ending. For example, mobile device 205 may provide a message indicating that mobile device 205 is located in an area of poor reception. Additionally, or alternatively, mobile device 205 may configure the call degradation application to cause mobile device 205 to block one or more subsequent calls from a particular caller for a period of time after performing call degradation. Additionally, or alternatively, mobile device 205 may configure the call degradation application to degrade call audio in a particular manner based on a particular stored caller. For example, mobile device 205 may store information associated with a caller (e.g., a telephone number, a name, or the like) and perform call degradation based on the information.

As further shown in FIG. 4, process 400 may include storing configuration information and/or configuring the call degradation application for use based on performing the configuration (block 440). For example, mobile device 205 may store configuration information in a data structure of mobile device 205 and/or configure the call degradation application for use. Additionally, or alternatively, mobile device 205 may store configuration information remotely in a data structure associated with a server.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
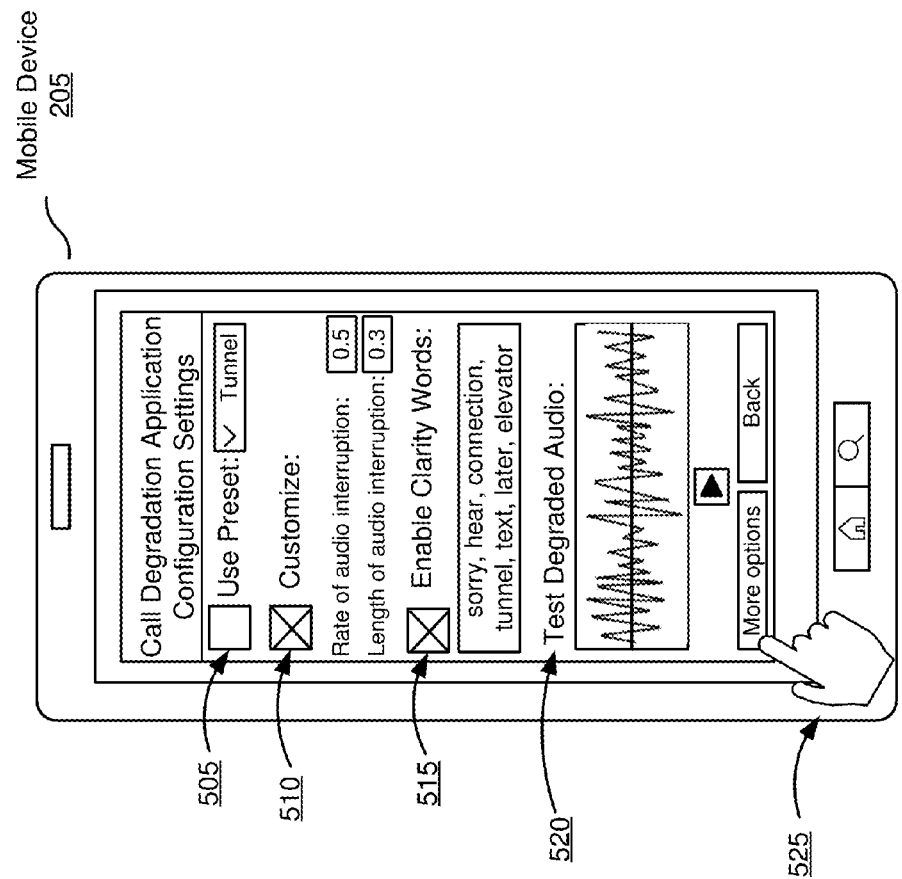
FIGS. 5A and 5B are diagrams of an example implementation relating to the example process shown in FIG. 4.
Figure 5B:
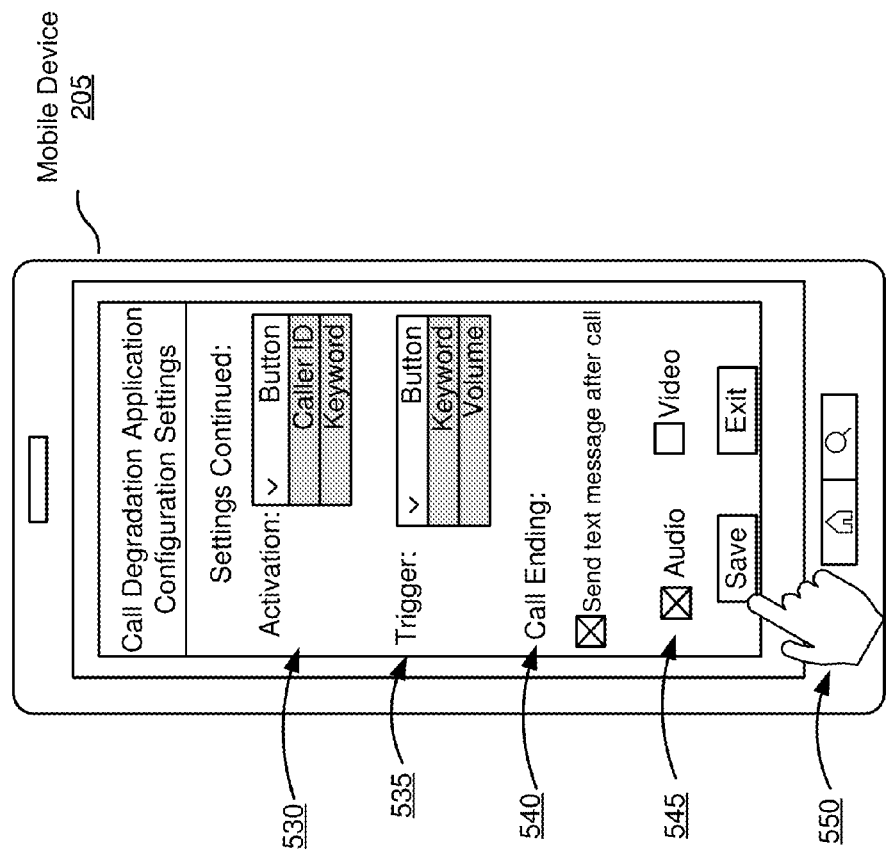

FIGS. 5A and 5B are diagrams of an example implementation 500 relating to example process 400 shown in FIG. 4. FIGS. 5A and 5B show an example of configuring a call degradation application.

As shown in FIG. 5A, mobile device 205 provides a user interface to a user to configure a set of parameters associated with a call degradation application. As shown by reference number 505, mobile device 205 provides a user interface element for configuring the call degradation application to degrade audio based on a preset scenario. As shown by reference number 510, a user interface element is selected to indicate that the user intends to customize the call degradation application for degrading audio (e.g., by selecting one or more parameters for degrading audio rather than a preset scenario). As shown by reference number 515, the user selects a checkbox to enable a set of allowable words that, when detected, will not be degraded (e.g., "sorry," "hear," "connection," "tunnel," "text," "later," "elevator," or the like). As shown by reference number 520, mobile device 205 provides a user interface element for displaying a waveform of a sample of degraded audio, and may provide audio output of the sample of degraded audio based on a user interaction with a button. Assume the sample of degraded audio is based on prerecorded audio, an audio sample recorded by mobile device 205, or the like and is adjusted based on the set of audio degradation parameters. In this way, mobile device 205 provides information to facilitate user adjustment of the one or more audio degradation parameters based on the displayed waveform and the provided audio output. As shown by reference number 525, based on a user interaction with a button of the user interface, mobile device 205 provides additional parameters associated with the configuration of the call degradation application for selection.

As shown in FIG. 5B, and by reference number 530, mobile device 205 provides a configuration option to activate the call degradation application based on a user interaction with a button in a user interface, a caller ID, a keyword, or the like. Assume that the user selects to activate the call degradation application based on a button activation. As shown by reference number 535, mobile device 205 provides a configuration option to trigger call degradation based on a user interaction with a button, a keyword, a volume, or the like. Assume the user selects to trigger call degradation based on a button trigger. As shown by reference number 540, mobile device 205 provides a configuration option to provide a text message after performing call degradation. As shown by reference number 545, mobile device 205 provides a configuration option to degrade call audio and/or video. As shown by reference number 550, based on a user interaction with a button associated with the user interface, mobile device 205 stores configuration information, such as the selected parameters or the like.

As indicated above, FIGS. 5A and 5B are provided merely as an example. Other examples are possible and may differ from what was described with regard to FIGS. 5A and 5B.

In this way, mobile device 205 may store a set of configuration parameters to configure a call degradation application for performing call degradation.

Figure 6:
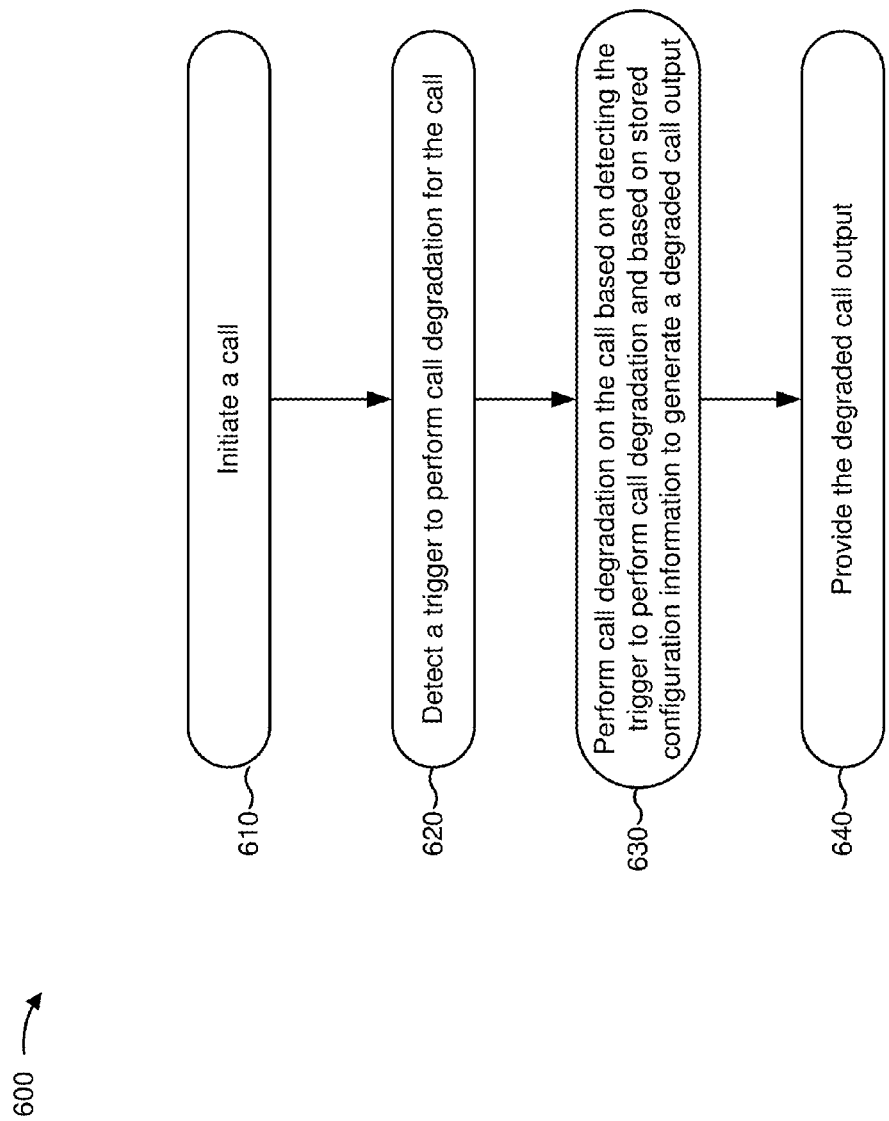
FIG. 6 is a flow chart of an example process for utilizing a call degradation application.

FIG. 6 is a flow chart of an example process 600 for utilizing a call degradation application. In some implementations, one or more process blocks of FIG. 6 may be performed by mobile device 205. In some implementations, one or more process blocks of FIG. 6 may be performed by another device or a group of devices separate from or including mobile device 205, such as base station 210, MME 215, SGW 220, PGW 225, HSS 230, and/or AAA 235.

As shown in FIG. 6, process 600 may include initiating a call (block 610). For example, a first mobile device 205 may initiate the call with a second mobile device 205 (e.g., via network 240). Additionally, or alternatively, the second mobile device 205 may initiate the call to the first mobile device 205. In some implementations, the call may include the transmission of audio, video, or the like between first mobile device 205 and second mobile device 205. For example, first mobile device 205 may provide audio to and/or receive audio from second mobile device 205.

As further shown in FIG. 6, process 600 may include detecting a trigger to perform call degradation for the call (block 620). For example, mobile device 205 (e.g., first mobile device 205) may activate the call degradation application, and may detect a trigger to perform call degradation after activating the call degradation application. In some implementations, mobile device 205 may detect the trigger based on configuration information associated with the call degradation application, as described in connection with FIG. 4. In some implementations, mobile device 205 may receive the trigger to perform call degradation based on monitoring the call. For example, when mobile device 205 is monitoring the call, mobile device 205 may detect a threshold volume, a particular word, a sound, or the like and trigger call degradation. In this way, mobile device 205 may determine a call to degrade based on a call content of the call. Additionally, or alternatively, mobile device 205 may detect the trigger to perform call degradation based on determining information associated with the call. For example, mobile device 205 may determine a telephone number, a contact name, a call history, or the like. In this way, mobile device 205 may determine a call to degrade based on information associated with particular callers.

Additionally, or alternatively, mobile device 205 may detect the trigger to perform call degradation based on information associated with mobile device 205. For example, mobile device 205 may detect the trigger to perform call degradation based on the location at which mobile device 205 is located. Additionally, or alternatively, mobile device 205 may detect the trigger to perform call degradation based on information associated with a user of mobile device 205. For example, mobile device 205 may detect the trigger to perform call degradation based on calendar information associated with mobile device 205, a user interaction with a button associated with mobile device 205, or the like.

As further shown in FIG. 6, process 600 may include performing call degradation on the call, to generate degraded call output, based on detecting the trigger to perform call degradation and based on stored configuration information (block 630). For example, mobile device 205 may perform call degradation on the call, to generate degraded call output, based on detecting the trigger to perform call degradation and based on stored configuration information. Degraded call output may refer to audio and/or video degraded based on stored configuration information. In some implementations, mobile device 205 may degrade call audio by inserting sound gaps into the degraded call output based on one or more parameters of the stored configuration information. For example, mobile device 205 may select a first parameter indicating a time interval in which to insert a sound gap into the audio and a second parameter indicating the length of the sound gap to insert into the audio.

In some implementations, mobile device 205 may degrade call audio based on a previous call degradation type utilized for a particular caller of the call. For example, mobile device 205 may degrade call audio to resemble a tunnel scenario when degrading a first call from a particular caller, and may degrade call audio to resemble the tunnel scenario when degrading a second call from the particular caller. In this way, mobile device 205 may provide consistency to users when performing call degradation.

In some implementations, mobile device 205 may degrade the call based on identifying words included in the audio. For example, mobile device 205 may monitor the call, and may identify one or more words in the call for selective degradation. In this case, mobile device 205 may degrade a first set of words of the call and omit a second set of allowable words of the call from degradation based on stored configuration information. Additionally, or alternatively, mobile device 205 may degrade the audio by adjusting a volume, adding an audio artifact, or the like. For example, mobile device 205 may alter a volume of a word to reduce a clarity associated with the call.

In some implementations, mobile device 205 may provide an indication that call degradation is triggered based on performing call degradation. For example, mobile device 205 may activate a light, play a sound, activate a vibration, activate an alert, or the like. In this way, mobile device 205 may reduce a likelihood that call degradation is performed inadvertently relative to performing call degradation without notifying a user of mobile device 205.

As further shown in FIG. 6, process 600 may include providing the degraded call output (block 640). For example, mobile device 205 (e.g., a first mobile device 205) may provide the degraded call output to a second mobile device 205 for playback. In some implementations, mobile device 205 may end the call after performing call degradation. For example, mobile device 205 may end the call after performing call degradation for a threshold period of time (e.g., 5 seconds, 10 seconds, or the like). Additionally, or alternatively, mobile device 205 may end the call, at a particular time, based on a type of call degradation. For example, when inserting sound gaps to remove one or more words in the audio, mobile device 205 may end the call based on detecting a particular word and/or a particular phrase indicating an end to the call (e.g., "talk to you later," "bye," or the like).

In some implementations, first mobile device 205 may provide other information to second mobile device 205 based on providing the degraded call output to second mobile device 205. For example, first mobile device 205 may provide a message (e.g., a short message service (SMS) message, an email, or the like) indicating that first mobile device 205 is calling from a location with poor network coverage and that the call may drop. In this way, first mobile device 205 may clarify a reason for ending the call with the second mobile device 205. Additionally, or alternatively, in this way, mobile device 205 may provide an indication of another type of communication to be used for further communication (e.g., text message, email messaging, or the like).

In some implementations, after providing the degraded call output, mobile device 205, may block incoming calls based on stored configuration information. For example, first mobile device 205 may block an incoming call from second mobile device 205 until a threshold period of time has elapsed. In this way, first mobile device 205 may prevent subsequent unwanted calls from second mobile device 205 by appearing to be in an area with poor reception.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of utilizing a call degradation application.

Figure 7A:
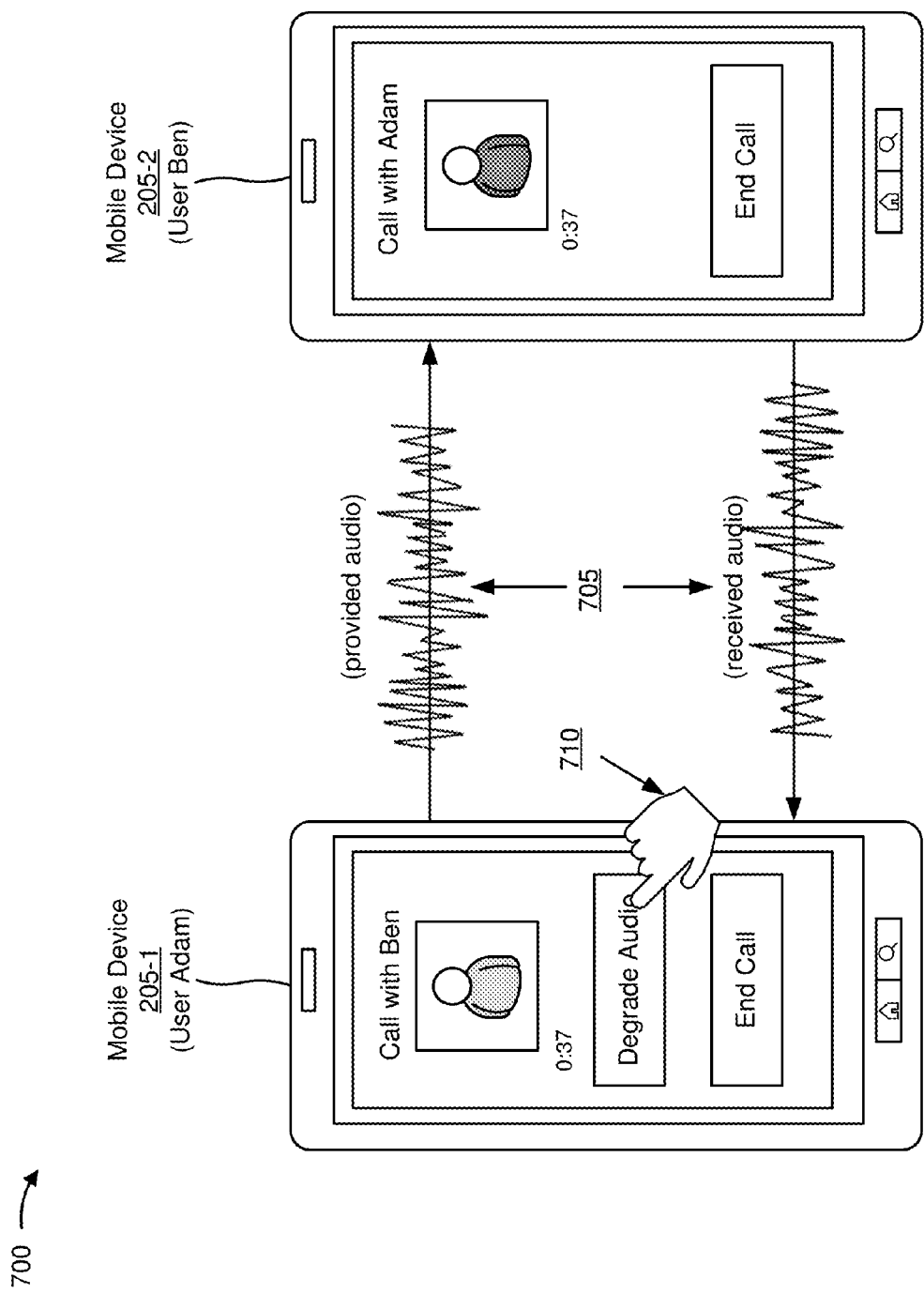
FIGS. 7A-7D are diagrams of an example implementation relating to the example process shown in FIG. 6.

As shown in FIG. 7A, a first user (e.g., "Adam") utilizes mobile device 205-1 to call a second user (e.g., "Ben") using mobile device 205-2. As shown by reference number 705, mobile device 205-1 provides audio to mobile device 205-2 and mobile device 205-1 receives audio from mobile device 205-2. Assume that the conversation between Adam and Ben turns toward a sensitive topic, such as politics. Assume further that, as a result, Adam desires to end the call. Thus, Adam invokes the call degradation application. As shown by reference number 710, based on a user interaction with a button, mobile device 205-1 is triggered to perform call degradation.

Figure 7B:
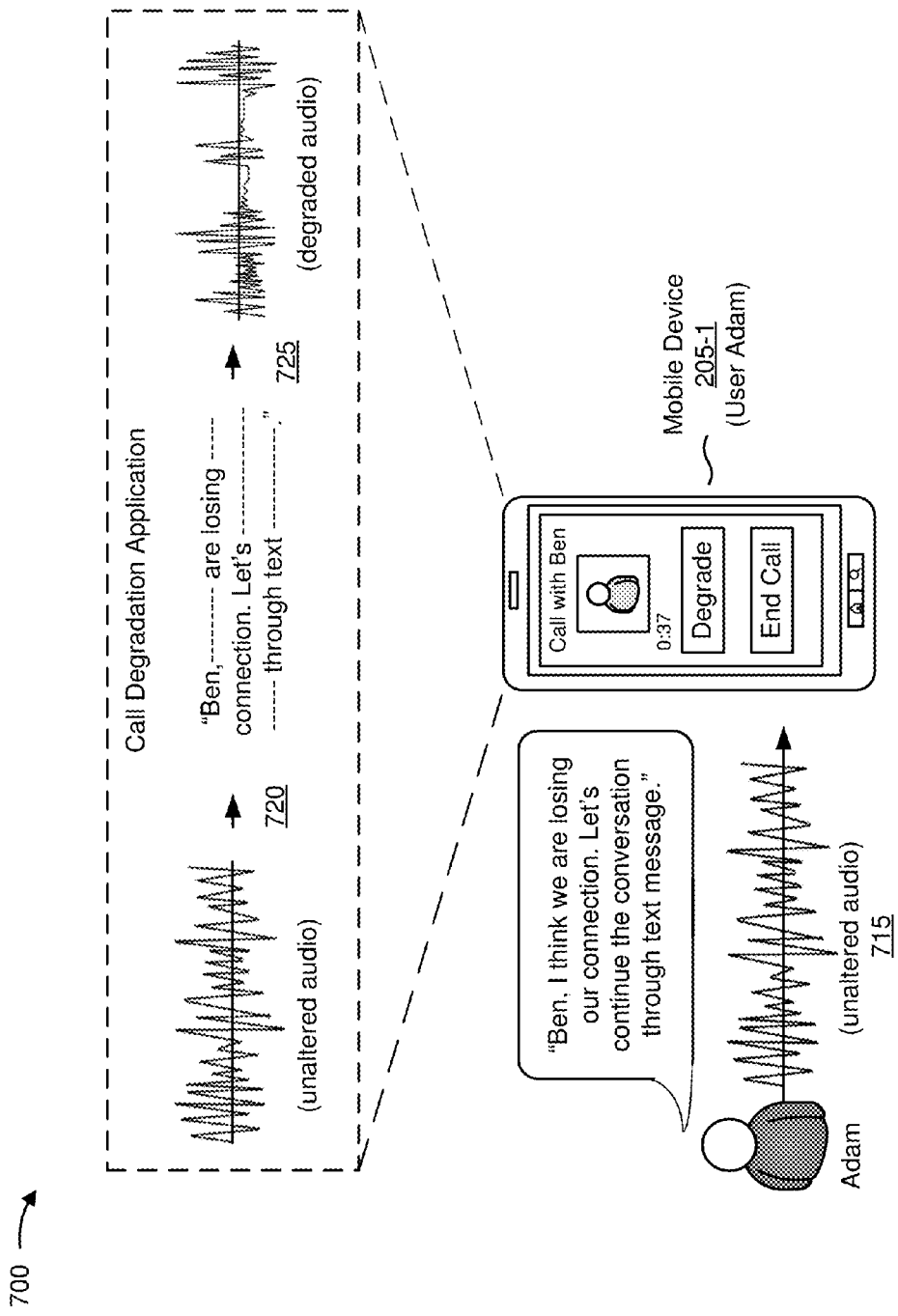

As shown in FIG. 7B, and by reference number 715, mobile device 205-1 receives unaltered audio when user Adam speaks (e.g., unaltered audio). As shown by reference number 720, mobile device 205-1 identifies words of the audio and determines a first portion of the words to omit from degradation and a second portion of the words to degrade based on stored configuration information. As shown by reference number 725, mobile devices 205-1 degrades audio corresponding to the second portion of words by inserting a set of sound gaps in the audio, thereby generating degraded audio.

Figure 7C:
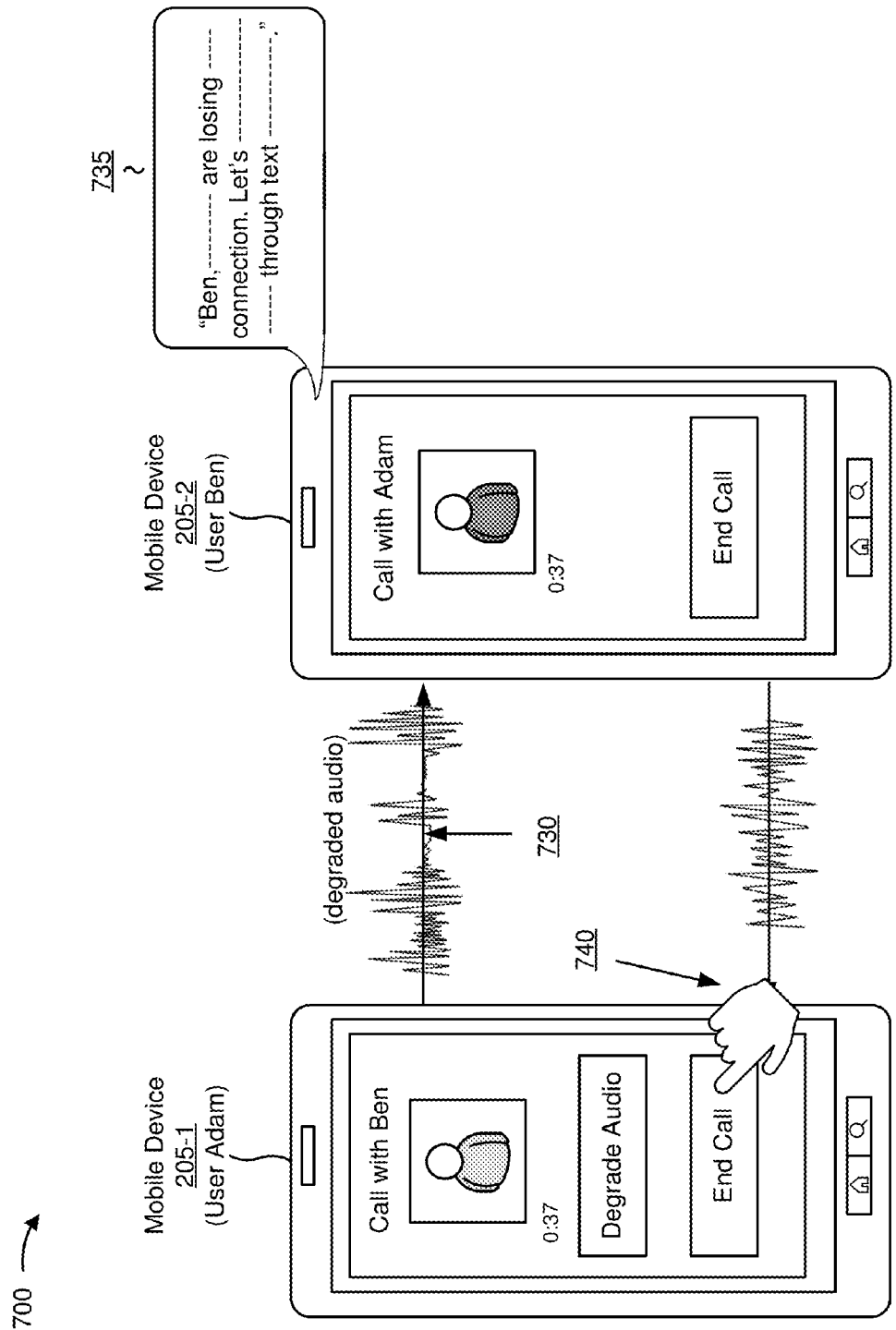

As shown in FIG. 7C, and by reference number 730, mobile device 205-1 provides the degraded audio to mobile device 205-2. As shown by reference number 735, mobile device 205-2 plays the degraded audio via a speaker. As shown by reference number 740, based on a user interaction associated with a button, mobile device 205-1 ends the call. Based on the degraded audio resembling a poor connection, Ben may interpret the ended call as a result of the poor connection, thereby avoiding Adam appearing impolite.

Figure 7D:
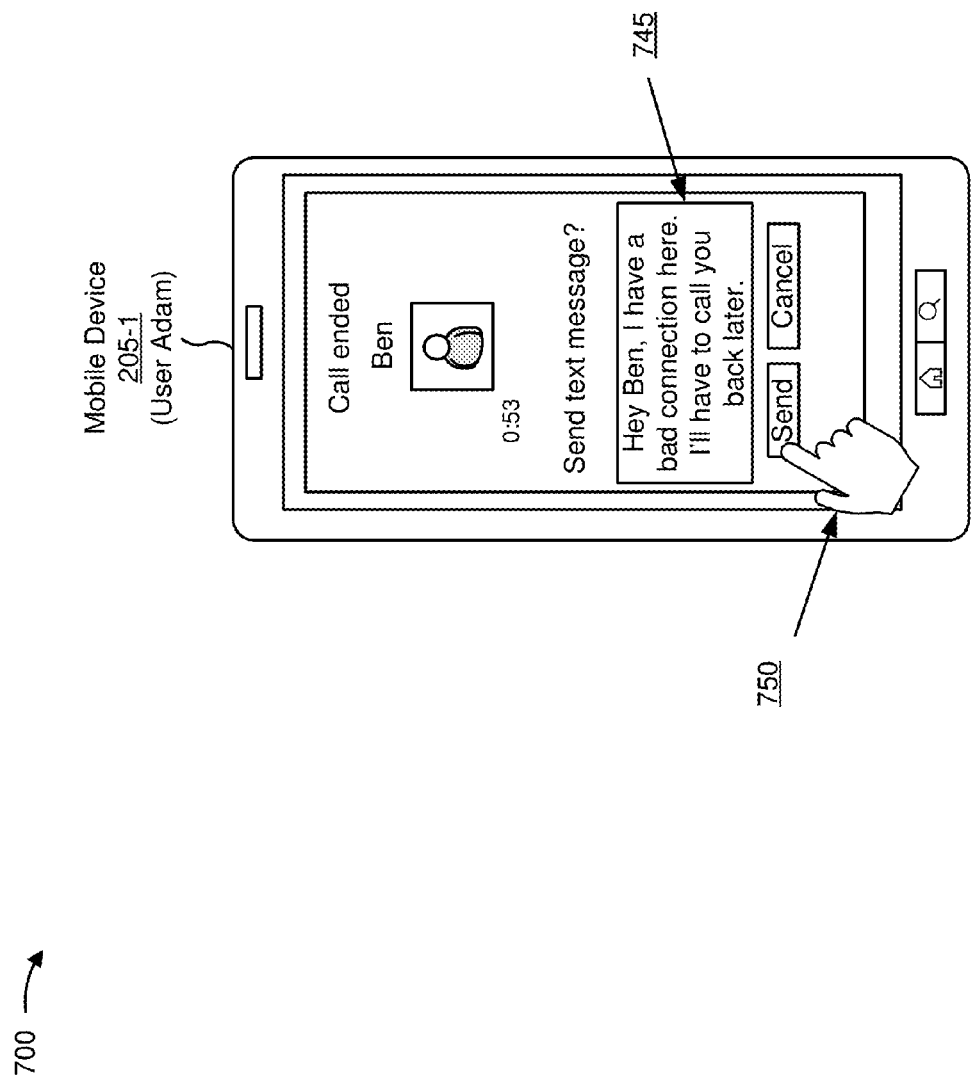

As shown in FIG. 7D, and by reference number 745, mobile device 205-1 generates a message to send to mobile device 205-2 based on ending the call. As shown by reference number 750, based on a user interaction with a button of mobile device 205-1, mobile device 205-1 provides the message to mobile device 205-2 for display. In this way, mobile device 205-1 may reduce a likelihood that Adam appears impolite relative to abruptly ending the call without providing a message.

As indicated above, FIGS. 7A-7D are provided merely as an example. Other examples are possible and may differ from what was described with regard to FIGS. 7A-7D.

Figure 8:
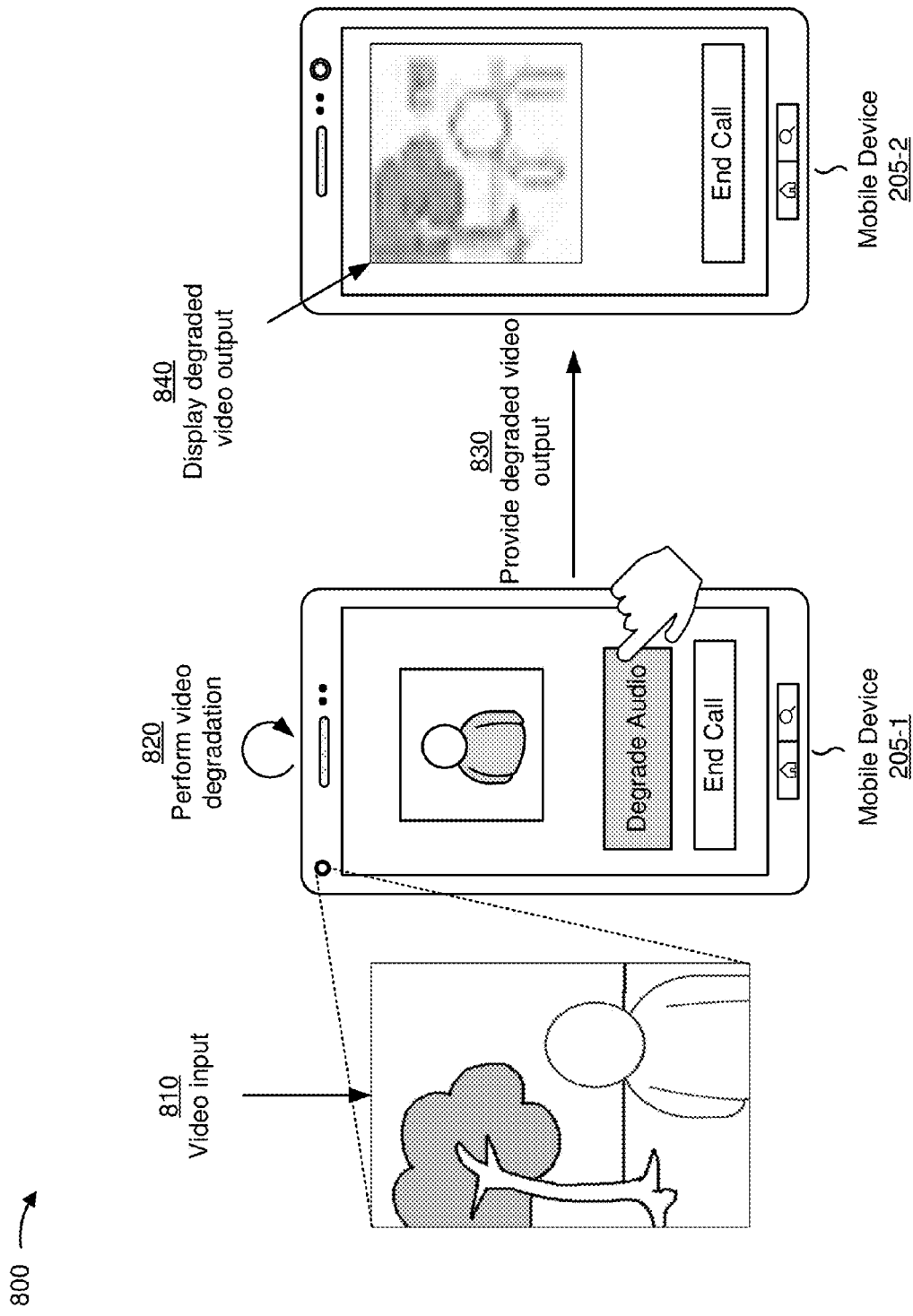
FIG. 8 is a diagram of another example implementation relating to the example process shown in FIG. 6.

FIG. 8 is a diagram of an example implementation 800 relating to example process 600 shown in FIG. 6. FIG. 8 shows another example of utilizing a call degradation application.

As shown in FIG. 8, and by reference number 810, mobile device 205-1 is engaged in a video call with mobile device 205-2 and captures video of a user of mobile device 205-1. As shown by reference number 820, mobile device 205-1 degrades the video based on stored configuration information associated with causing mobile device 205-1 to blur the video call. As shown by reference number 830, mobile device 205-1 provides the degraded video output to mobile device 205-2. As shown by reference number 840, the degraded video output is displayed by mobile device 205-2. Based on a user of mobile device 205-2 interpreting the degraded video as a poor connection between mobile device 205-1 and mobile device 205-2, mobile device 205-1 may end the call without the first user appearing impolite.

As indicated above, FIG. 8 is provided merely as an example. Other examples are possible and may differ from what was described with regard to FIG. 8.

In this way, a first mobile device 205 may degrade a call with a second mobile device 205 to permit a first user of first mobile device 205 to end the call without the first user appearing impolite.

Moreover, reducing a quantity of time spent on an unwanted call may save a device and/or a server associated with the unwanted call memory, data, battery life, or the like. Additionally, or alternatively, an ability to end an unwanted call when desired may reduce a data usage, increase battery life, or the like, relative to remaining on the unwanted call.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      detect a trigger to perform call degradation on audio and/or video of a call, the call being with another device;
      identify one or more parameters associated with performing the call degradation on the audio and/or video of the call,
         the one or more parameters including a parameter associated with degrading the audio and/or video of the call;
      perform the call degradation on the audio and/or video of the call based on detecting the trigger to perform the call degradation and based on the one or more parameters to generate degraded audio and/or video output;
      provide the degraded audio and/or video output to the other device;
      end the call after performing the call degradation;
      generate a message based on ending the call; and
      provide the message to the other device.

2. The device of claim 1,
   where the one or more processors are further to:
      identify a set of words of the call,
         the set of words including a first one or more words corresponding to a set of allowable words associated with the one or more parameters, and
         the set of words including a second one or more words not corresponding to the set of allowable words; and
   where the one or more processors, when performing the call degradation on the audio and/or video of the call, are to:

degrade audio and/or video of the call corresponding to the second one or more words without degrading audio and/or video of the call corresponding to the first one or more words.

3. The device of claim 1,
where the one or more processors are further to:
determine a location associated with the device based on detecting the trigger to perform the call degradation; and
select a type of call degradation to perform based on a particular parameter, of the one or more parameters, and based on the location; and
where the one or more processors, when performing the call degradation on the audio and/or video of the call, are to:
perform the call degradation based on the type of call degradation.

4. The device of claim 1,
where the one or more processors are further to:
provide, via a user interface, a button associated with triggering call degradation; and
detect a user interaction with the button; and
where the one or more processors, when detecting the trigger, are to:
detect the trigger to perform the call degradation based on detecting the user interaction with the button.

5. The device of claim 1,
where the one or more processors are further to:
determine that a duration of the call satisfies a threshold; and
where the one or more processors, when detecting the trigger to perform the call degradation, are to:
detect the trigger based on determining that the duration of the call satisfies the threshold.

6. The device of claim 1,
where the one or more processors are further to:
determine information associated with a calendar,
the calendar indicating that a user of the device is engaged during a particular period of time; and
determine that the call is occurring during the particular period of time; and
where the one or more processors, when detecting the trigger to perform call degradation, are to:
detect the trigger to perform the call degradation based on determining that the call is occurring during the particular period of time.

7. The device of claim 1, where, when detecting the trigger to perform the call degradation, the one or more processors are to:
detect the trigger to perform the call degradation based on content of the audio and/or video of the call.

8. A computer-readable medium storing instructions, the instructions comprising:
one or more instructions that, when executed by one or more processors of a mobile device, cause the one or more processors to:
identify a set of parameters associated with performing call degradation on a call,
the call being with another mobile device, and
the set of parameters including a first parameter associated with triggering performance of call degradation and a second parameter associated with degrading audio and/or video of the call;
detect a trigger to perform call degradation on the call based on the first parameter;
perform the call degradation on the call based on detecting the trigger and based on the second parameter; and
provide degraded output to the other mobile device based on performing the call degradation of the call.

9. The computer-readable medium of claim 8,
where the first parameter relates to a particular word;
where the one or more instructions, when executed by the one or more processors, further cause the one or more processors to:
monitor the audio of the call; and
detect the particular word in the audio of the call based on monitoring the call; and
where the one or more instructions, that cause the one or more processors to detect the trigger, cause the one or more processors to:
detect the trigger based on detecting the particular word in the audio of the call.

10. The computer-readable medium of claim 8,
where the second parameter is associated with degrading a first call to resemble a second call placed from a particular location with poor reception; and
where the one or more instructions, that cause the one or more processors to perform call degradation, cause the one or more processors to:
perform the call degradation to cause the degraded output to resemble the second call placed from the particular location with poor reception.

11. The computer-readable medium of claim 8,
where the first parameter relates to a volume threshold;
where the one or more instructions, when executed by the one or more processors, further cause the one or more processors to:
monitor the audio of the call; and
determine that a volume of the audio of the call satisfies the volume threshold; and
where the one or more instructions, that cause the one or more processors to detect the trigger, cause the one or more processors to:
detect the trigger based on determining that the volume of the audio of the call satisfies the threshold.

12. The computer-readable medium of claim 8,
where the one or more instructions, that cause the one or more processors to perform call degradation, cause the one or more processors to:
insert a set of sound gaps into the audio of the call,
inserting the set of sound gaps including removing portions of the audio at a particular interval for a particular length of time,
the particular interval and the particular length of time being determined based on the second parameter.

13. The computer-readable medium of claim 8,
where the one or more instructions, when executed by the one or more processors, further cause the one or more processors to:
determine that an identity of a caller of the call corresponds to a set of caller identities for which the call degradation is to be performed; and
where the one or more instructions, that cause the one or more processors to detect the trigger, cause the one or more processors to:
detect the trigger based on determining that the identity of the caller corresponds to the set of caller identities for which the call degradation is to be performed.

14. The computer-readable medium of claim 8,
where the one or more instructions, when executed by the one or more processors to, further cause the one or more processors to:
   identify a natural scenario based on the second parameter,
      the natural scenario being associated with a call degradation type; and
where the one or more instructions, that cause the one or more processors to perform the call degradation, cause the one or more processors to:
   perform the call degradation based on the call degradation type.

15. A method, comprising:
initiating, by a device, a call with another device;
detecting, by the device, a trigger to perform call degradation on the call;
identifying, by the device, a set of parameters associated with performing the call degradation on audio and/or video of the call,
   the set of parameters including a parameter associated with degrading the audio and/or video of the call by inserting one or more audio and/or video artifacts into the audio and/or video of the call;
performing, by the device, the call degradation on the audio and/or video of the call based on detecting the trigger to perform call degradation and based on the set of parameters to generate degraded audio and/or video output; and
providing, by the device, the degraded audio and/or video output.

16. The method of claim 15, where performing the call degradation comprises:
   determining that a threshold period of time has elapsed from detecting the trigger to perform call degradation; and
   ending the call based on determining that the threshold period of time has elapsed.

17. The method of claim 15, further comprising:
ending the call after providing the degraded audio and/or video output; and
providing a message to the other device based on ending the call,
   the message indicating that the call was dropped.

18. The method of claim 15, where performing the call degradation comprises:
reducing a volume of the audio of the call.

19. The method of claim 15, further comprising:
identifying a caller associated with the other device;
obtaining information identifying a type of call degradation utilized for another call with the caller; and
   where performing the call degradation comprises:
      performing the call degradation based on the type of call degradation utilized for the other call with the caller.

20. The method of claim 15, further comprising:
detecting a volume level of the audio and/or video of the call, and
determining that the volume level satisfies a threshold,
   where detecting the trigger to perform the call degradation on the call comprises:
      detecting the trigger to perform the call degradation based on determining that the volume level satisfies the threshold.

* * * * *